United States Patent
Pawar et al.

(10) Patent No.: US 11,026,212 B1
(45) Date of Patent: Jun. 1, 2021

(54) CONTROL OF UE CONNECTIVITY BASED ON EFFECTIVE BANDWIDTH OF TDD CARRIER

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 61 days.

(21) Appl. No.: 16/597,369

(22) Filed: Oct. 9, 2019

(51) Int. Cl.
*H04W 72/04* (2009.01)
*H04L 5/14* (2006.01)
*H04W 76/15* (2018.01)

(52) U.S. Cl.
CPC ....... *H04W 72/0413* (2013.01); *H04L 5/1469* (2013.01); *H04W 72/0453* (2013.01); *H04W 72/0493* (2013.01); *H04W 76/15* (2018.02)

(58) Field of Classification Search
CPC ......... H04W 72/0413; H04W 72/0493; H04W 72/0453; H04W 76/15; H04L 5/1469
See application file for complete search history.

(56) References Cited

U.S. PATENT DOCUMENTS

| | | | |
|---|---|---|---|
| 2012/0243453 A1* | 9/2012 | Hakola | H04L 5/003 370/311 |
| 2019/0044678 A1* | 2/2019 | Liu | H04L 5/0098 |
| 2019/0215857 A1* | 7/2019 | Lin | H04L 5/0057 |
| 2019/0245670 A1* | 8/2019 | Yin | H04L 5/0053 |
| 2020/0136751 A1* | 4/2020 | Guo | H04L 5/0094 |
| 2020/0413351 A1* | 12/2020 | Xie | H04W 52/34 |
| 2021/0022136 A1* | 1/2021 | Kimba Dit Adamou | H04W 40/22 |

* cited by examiner

*Primary Examiner* — Brian D Nguyen (57) ABSTRACT

A method and system for controlling wireless connectivity between a user equipment device (UE) and an access node, where the access node supports operation on an FDD carrier and a TDD carrier, where FDD carrier has an uplink bandwidth, and where the TDD carrier has an effective uplink bandwidth that is defined based on an actual bandwidth of the TDD carrier limited by how often the TDD carrier is uplink (e.g., per a frame configuration). A method includes detecting, when the UE is connected with the access node on the TDD carrier, that the UE will engage in a threshold great extent of uplink data communication to the access node and, responsive to at least the detecting, reconfiguring the UE's connection by replacing the TDD carrier with the FDD carrier, based on the uplink bandwidth of the FDD carrier being greater than the effective uplink bandwidth of the TDD carrier.

20 Claims, 3 Drawing Sheets

---

DETECT, WHEN A UE HAS A CONNECTION WITH AN ACCESS NODE ON A TDD CARRIER, THAT THE UE WILL ENGAGE IN A THRESHOLD GREAT EXTENT OF UPLINK DATA COMMUNICATION TO THE ACCESS NODE — 40

RESPONSIVE TO AT LEAST THE DETECTING, RECONFIGURE THE UE'S CONNECTION WITH THE ACCESS NODE BY REPLACING THE TDD CARRIER WITH AN FDD CARRIER, BASED ON THE UPLINK FREQUENCY BANDWIDTH OF THE FDD CARRIER BEING GREATER THAN AN EFFECTIVE UPLINK FREQUENCY BANDWIDTH OF THE TDD CARRIER — 42

CONTROL OF UE CONNECTIVITY BASED ON EFFECTIVE BANDWIDTH OF TDD CARRIER

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that may provide connectivity with various application servers and/or transport networks, such as the public switched telephone network (PSTN) and/or the Internet for instance. With this arrangement, a UE within coverage of the cellular network could engage in air interface communication with an access node and may thereby communicate via the access node with various application servers and/or other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And more recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could have a respective bandwidth centered on a respective center frequency, defining a respective range of frequency extending from a low-end frequency to a high-end frequency.

Further, on the downlink and uplink respectively, the air interface defined by each carrier under an example RAT could be structured over time and frequency to define physical air-interface resources for carrying information between the access node and UEs.

Without limitation for instance, the air interface could be divided over time into frames, which can be divided in turn into subframes, timeslots, and symbol time-segments. And the carrier bandwidth (frequency width of the carrier on the downlink and/or uplink) could be divided over frequency into subcarriers. As a result, the air interface could define an array of resource elements per subframe, each occupying a respective subcarrier and spanning a respective symbol time segment, and the subcarrier of each such resource element could be modulated using an applicable modulation scheme to carry data over the air. Further, the air interface could be configured to group these resource elements into physical resource blocks (PRBs) across the carrier bandwidth, and the access node could be configured to allocate some or all of these PRBs for use to carry data on an as-needed basis.

OVERVIEW

When a UE enters into coverage of an example network, the UE could detect threshold strong coverage of an access node on a carrier and could then engage in random-access and Radio Resource Control (RRC) signaling to establish an RRC connection with the access n ode on that carrier. Further, if the UE is not already registered for service with the core network, the UE could transmit to the access node an attach request, which the access node could forward to a core-network controller for processing. And the core-network controller could then coordinate setup for the UE of one or more user-plane bearers for carrying packet-data communications between the UE and a core-network gateway that provides packet-network connectivity.

Once the UE is so connected and registered, the access node could then serve the UE in a connected mode on the carrier, managing downlink air-interface communication of packet data to the UE and uplink air-interface communication of packet data from the UE.

For instance, when data arrives at the access node for transmission to the UE, the access node could buffer the data pending transmission to the UE, and the access node could select and allocate one or more downlink PRBs in an upcoming subframe for use to transmit at least a portion of the data, defining a transport block, to the UE. The access node could then transmit to the UE in a control channel of that subframe a Downlink Control Information (DCI) message that designates the downlink PRBs, and the access node could accordingly transmit the transport block to the UE in those designated downlink PRBs, such as by modulating the subcarriers of resource elements in those PRBs to carry symbols representing the data.

And when the UE has data to transmit to the access node, the UE could buffer the data pending transmission to the access node and could transmit to the access node a scheduling request that carries with it a buffer status report (BSR) indicating how much data the UE has buffered for transmission. And in response, the access node could select and allocate one or more uplink PRBs in an upcoming subframe for carrying a transport block of that data from the UE and could transmit to the UE (in a downlink control channel of a preceding subframe) a DCI message that designates those upcoming uplink PRBs. The UE could then accordingly transmit the transport block to the access node in the designated uplink PRBs, such as by modulating the subcarriers of resource elements in those PRBs to carry symbols representing the data.

In an example implementation, an access node may serve multiple UEs at once on the carrier. Thus, as data arrives at the access node for transmission to the various UEs, the access node may apply a scheduling algorithm in an effort to fairly and appropriately allocate downlink PRBs on the carrier among the various UEs. Likewise, as UEs request uplink resources, the access node may apply a scheduling algorithm in an effort to fairly and appropriately allocate uplink PRBs of the carrier among the various UEs.

As noted above, the carrier on which a UE may be connected with such an access node could be FDD, defining separate uplink and downlink frequency channels, or TDD, with a single frequency channel multiplexed between downlink and uplink. Further, as noted above, each such frequency channel would have a defined frequency bandwidth spanning an associated range of frequency. Therefore, each such channel would have an associated capacity for carrying data communications, for instance based on the number of useable PRBs defined across the channel's frequency bandwidth.

In practice, however the capacity of a TDD carrier for carrying downlink or uplink communication is additionally limited by the fact that the TDD carrier is downlink just some of the time and uplink just some of the time.

A representative TDD carrier could be structured with a particular TDD frame configuration defining a sequence of equal-duration subframes and establishing which subframes are for downlink use and which subframes are for uplink use. Further, the TDD frame configuration may designate certain subframes as special subframes, with part being downlink and part being uplink, to help facilitate transition from downlink to uplink operation. Thus, a representative TDD frame configuration could establish for each subframe per frame whether the subframe is a downlink subframe (D), an uplink subframe (U), or a special subframe (S).

Various TDD frame configurations could be feasible. In LTE, for instance, the air interface on a TDD carrier defines a continuum of 10-millisecond frames, each divided into ten 1-millisecond subframes, and LTE defines seven standard TDD configurations as set forth in Table 1.

TABLE 1

| TDD Configuration | Subframe Number (0-9) | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Non-standard implementations and/or other radio access technologies may define other frame structures and other TDD frame configurations as well.

With such multiplexing of downlink and uplink, the effective capacity of a TDD carrier for downlink communication or for uplink communication over time is really just a fraction of the capacity defined by useable PRBs across the TDD carrier's bandwidth. Phrased another way, respectively for downlink and uplink communication, the TDD carrier could be considered to have an effective bandwidth that is defined as the actual bandwidth of the TDD carrier limited by how often the TDD carrier is downlink or uplink respectively.

This capacity limitation of a TDD carrier could pose a technological problem for uplink communication in particular when a UE is connected with and served by the access node on the TDD carrier and the TDD carrier is configured with a TDD frame configuration that is uplink for relatively little time per frame. For instance, if the TDD carrier is 20 MHz and is configured with FC2 as shown in Table 1, just two subframes per frame are uplink, resulting in an effective uplink bandwidth of just about 4 MHz (give or take some frequency, depending on whether special subframes and other factors are taken into consideration).

If a UE is connected with and served by the access node on such a TDD carrier and is going to engage in uplink-intensive communication (i.e., uplink communication of relatively extensive quantity of data and/or at a relatively high desired data rate), the limited effective uplink bandwidth of the TDD carrier could function as a bottleneck. Namely, given that limited effective uplink bandwidth, the access node may not have sufficient uplink capacity (e.g., per unit time) on the TDD carrier to accommodate the UE's uplink communication needs. This may be especially so if and when the access node is serving multiple UEs at the time on the carrier.

The present disclosure helps to address this issue by providing for automatic reconfiguration of a UE's connection with an access node based on a consideration of the effective uplink bandwidth of the TDD carrier on which the UE is connected with the access node. In particular, the disclosure addresses a scenario where a UE is connected with an access node on a TDD carrier and where the access node also supports operation on one or more FDD carriers.

In accordance with the disclosure, when the UE is connected with the access node on the TDD carrier, the access node will detect that the UE will engage in a threshold great extent of uplink communication, such as communication of a type that is typically uplink-intensive for example. In response to at least detecting this situation, the access node will then reconfigure the UE's connection with the access node by replacing the TDD carrier with an FDD carrier based on the uplink bandwidth of the FDD carrier being greater than the effective bandwidth of the TDD carrier.

By way of example, if the UE is connected with and served by the access node on a TDD carrier that has an actual bandwidth of 20 MHz and that the access node has configured with FC2 so that the TDD carrier has an effective uplink bandwidth of about 4 MHz, the access node may decide to replace that carrier in the UE's connection with an FDD carrier that has an uplink bandwidth of 5 MHz or more, based on the uplink bandwidth of the FDD carrier being greater than the effective uplink bandwidth of the TDD carrier.

Here, the comparison is not between the actual bandwidth of the TDD carrier and the uplink bandwidth of the FDD carrier but is rather between the effective bandwidth of the TDD carrier and the uplink bandwidth of the FDD carrier. And as discussed above, the effective bandwidth of the TDD carrier could be defined as the actual bandwidth of the TDD carrier limited by how often the TDD carrier is uplink, such as multiplied by a ratio of time per frame that the TDD carrier is uplink to time per frame that the TDD carrier is not uplink.

In practice, the access with which the UE is connected on the TDD carrier might support both operation on that TDD carrier and operation on the FDD carrier. Based on the present process, the access node may thus decide to reconfigure the UE's connection to replace the TDD carrier with the FDD carrier.

Further, the access node might support operation on multiple FDD carriers, each having respective uplink bandwidth. And per the present process, the access node might select an FDD carrier from among those multiple FDD carriers based on the uplink bandwidth of the selected FDD carrier in particular being greater that the effective uplink bandwidth of the TDD carrier on which the UE is connected, and the access node might then reconfigure the UE's connection to replace the TDD carrier with the selected FDD carrier.

Still further, it is possible that when the UE is connected with the access node on the TDD carrier, the UE's connection with the access node also encompasses the FDD carrier. For instance, the access node may be serving the UE with carrier aggregation on an aggregate of the TDD carrier and the FDD carrier. In that situation, the TDD carrier might be an anchor carrier of the UE's carrier-aggregation service, such as a primary component carrier (PCC), which might be key for some or all uplink communication from the UE to the access node, and the FDD carrier might be a secondary component carrier (SCC) added to the UE's connection to help provide increased peak data rate.

With the present process, in this carrier-aggregation scenario, the access node might detect that the UE is going to engage in a threshold great extent of uplink communication and might responsively reconfigure the UE's connection by replacing the TDD carrier as PCC with the FDD carrier as PCC, based on the uplink bandwidth of the FDD carrier being greater than the effective uplink bandwidth of the TDD carrier. For instance, the access node might swap the TDD carrier and FDD carrier in the UE's connection, changing the FDD carrier from being SCC to being PCC, and changing the TDD carrier from being PCC to being SCC.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports 4G LTE and 5G NR service. However, it should be understood that the principles disclosed herein could extend to apply with respect to other scenarios as well, such as with respect to a single-RAT system and/or with respect to one or more other RATs. Further, it should be understood that other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processor executing instructions stored in non-transitory data storage, along with associated circuitry or other hardware, among other possibilities.

Figure 1:
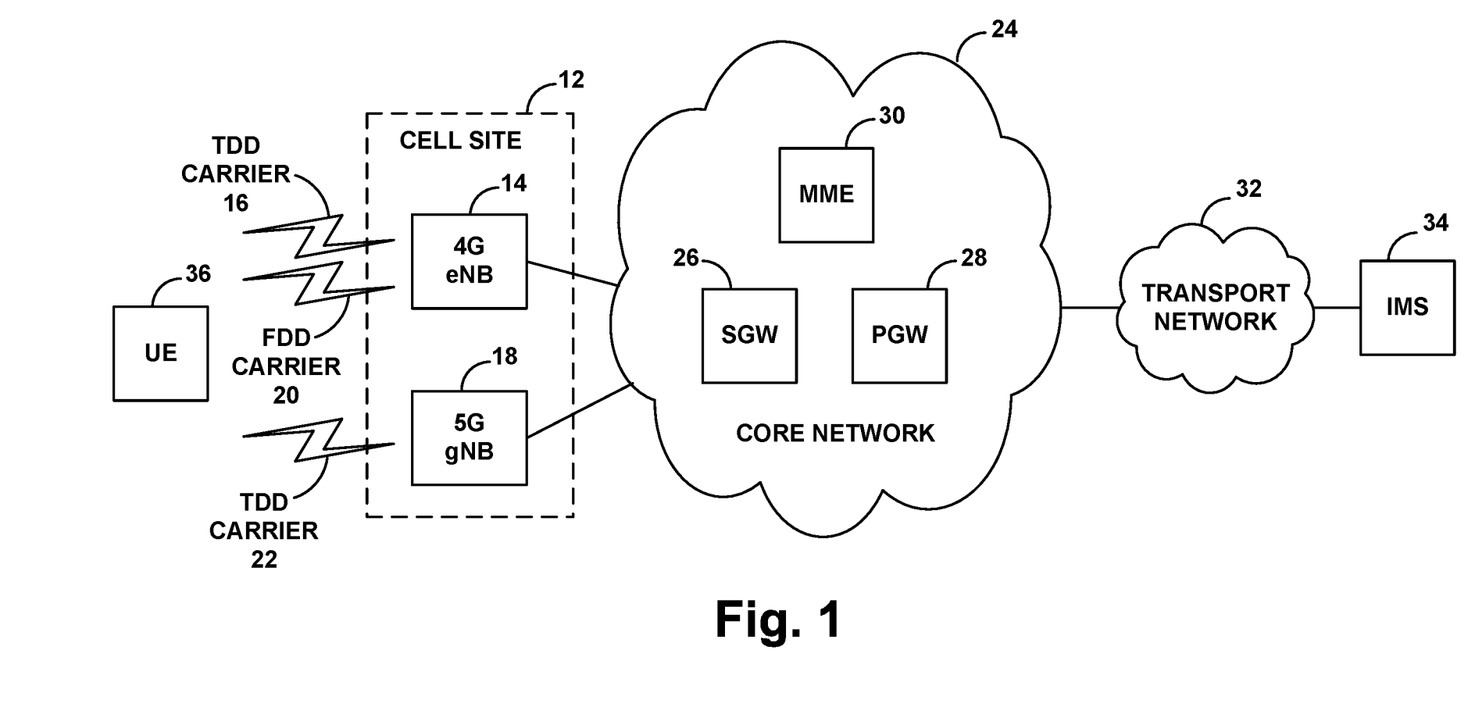
FIG. 1 is a simplified block diagram of an example network arrangement in which aspects of the present disclosure can be implemented.

FIG. 1 depicts an example cell site 12 that includes a 4G access node (e.g., 4G evolved Node-B (eNB)) 14 that is configured to provide LTE service on at least one TDD carrier 16 and at least one FDD carrier 18, and a 5G access node (e.g., 5G next-generation Node-B (gNB)) 20 that is configured to provide 5G NR service on at least one TDD carrier 22. These access nodes could be collocated with each other at the cell site 12 (e.g., sharing a common antenna tower and other equipment) and could provide coverage of largely the same direction and geographic scope as each other, to define overlapping coverage in which to serve UEs.

In practice, these illustrated access nodes could be coupled with a common core network or with different respective core networks, which could provide connectivity with one or more transport networks such as the Internet for instance. In the example shown, for instance, the 4G eNB 14 and 5G gNB 20 could be connected with a common core network 24, which could be an Evolved Packet Core (EPC) network or Next Generation Core (NGC) network, among other possibilities.

The illustrated core network 24 includes by way of example a serving gateway (SGW) 26, a packet data network gateway (PGW) 28, and a mobility management entity (MME) 30. With this arrangement, each access node could have an interface with the SGW 26, the SGW 26 could have an interface with the PGW 28, and the PGW 28 could provide connectivity with a transport network 32. Further, each access node could have an interface with the MME 30, the MME 30 could have an interface with the SGW 26, and the access nodes could have an interface to engage in signaling with each other. The MME 30 could then operate as the core-network controller noted above, responsible for coordinating setup of user-plane bearer connections for carrying UE data traffic through the core network to and from the UE. As further shown, the core network 24 and/or transport network 32 provides connectivity with an IMS 34, which functions to support packet-based real-time media services as noted above.

Each of the carriers illustrated in FIG. 1 structured as described above for instance, with each illustrated FDD carrier having respective downlink and uplink frequency channels and each TDD carrier having a respective frequency channel multiplexed over time between downlink and uplink use. In an example implementation, the bandwidth of each such frequency channel might be 1.4 MHz, 3 MHz, 5 MHz, 10 MHz, 15 MHz, or 20 MHz, among many other possibilities.

On each such carrier on which an access node is configured to provide service, the access might broadcast certain signals to enable UEs to detect coverage of the carrier and be served on the carrier. For instance, the access node might broadcast a synchronization signal on the downlink of the carrier, to enable UEs to detect the presence of coverage on the carrier, and the access node might broadcast a reference signal on the downlink of the carrier, to enable UEs to gauge the strength of coverage from the access node on the carrier. Further, the access node may further broadcast a system message (such as a master information block (MIB)) that specifies the carrier bandwidth (e.g. single bandwidth if TDD, or respective downlink and uplink bandwidths if FDD).

Shown within coverage of cell site 12 is an example UE 36, which could be of any of the types discussed above, among other possibilities. Although just one UE is shown in the figure, it is understood that the cell site might serve multiple UEs at a time as noted above. UE 36 could be configured to support 4G LTE operation and could be further configured to support 5G NR operation and possibly dual-connectivity on 4G LTE and 5G NR.

When UE 34 initially enters into coverage of the example cell site, the UE might initially scan for 4G LTE coverage, and the UE might detect sufficiently strong coverage of the 4G eNB 14 on both a TDD carrier 16 and an FDD carrier 18.

In an example implementation, the UE may be configured to prioritize operation on TDD over operation on FDD. Therefore, having detected sufficiently strong coverage of TDD carrier 16 and FDD carrier 18, the UE may then opt to connect with the 4G eNB 14 on the TDD carrier 16 rather than on the FDD carrier 18.

The UE may thus engage in signaling as discussed above to connect with the 4G eNB 14 on the TDD carrier 16. For instance, the UE may engage in random-access signaling with the 4G eNB 14 on the TDD carrier and may then engage in RRC signaling with the 4G eNB 14 on the TDD carrier to establish an RRC connection with the 4G eNB 14 on the TDD carrier, and the 4G eNB 14 may establish a context record for the UE's connection.

Further, if the UE is not yet registered for service, the UE may engage in attach signaling via the 4G eNB 14 with the MME 30 to register for service, and the MME 30 may coordinate setup for the UE of one or more user-plane bearers, such as a best-efforts bearer (e.g., QCI 9) and an IMS signaling bearer (e.g., QCI 5) for instance, with the 4G eNB 14 updating the UE's context record accordingly to indicate each such bearer established for the UE.

Once the UE is so connected with the 4G eNB 14, the 4G eNB 14 could then serve the UE, coordinating packet-data communications over the air interface to and from the UE as discussed above. For instance, the 4G eNB 14 could coordinate downlink transmission to the UE on downlink PRBs of the TDD carrier and could coordinate uplink data transmission from the UE on uplink PRBs of the TDD carrier.

When the UE is so served by the 4G eNB 14 on the TDD carrier, the UE may engage in various types of packet-data communications, and the MME 30 when appropriate may also coordinate setup for the UE of one or more additional bearers to support certain types of communications. For example, if the UE subscribes to VOP service and the UE engages in SIP signaling with the IMS 34 in order to place or receive a VOP call, the MME 30 may responsively coordinate setup for the UE of a VOP bearer (e.g., QCI 1) for carrying VOP data. As another example, if the UE initiates a streaming-video session, the MME 30 may responsively coordinate setup for the UE of a streaming-video bearer (e.g., QCI 6) for carrying the streaming video content. And yet another example, if the UE in initiates a real-time gaming session, the MME 30 may responsively coordinate setup for the UE of a real-time gaming bearer (e.g., QCI 3) for carrying the real-time gaming traffic. Other examples are possible as well.

Upon setup of each such bearer, the 4G eNB 14 could update its context record for the UE's connection to indicate that the bearer is established for the UE. Further, when such communications end (e.g., when a VOP call gets disconnected), the MME could tear down or release the associated bearers, and the 4G eNB 14 could accordingly update its context record for the UE's connection to no longer indicate that the bearers are established for the UE.

In addition, when the UE is connected with and served by the 4G eNB 14 on a carrier such, the 4G eNB 14 may add one or more additional carriers to the UE's RRC connection and may serve the UE with carrier-aggregation as noted above, to help provide the UE with increased peak data rate of communication. By way of example, when the UE is connected with and served by the 4G eNB 14 on the TDD carrier 16, the 4G eNB 14 might receive a report from the UE that the UE is also within threshold strong coverage of the 4G eNB 14 on the FDD carrier 18, and the 4G eNB 14 may responsively add the FDD carrier 18 to the UE's RRC connection. To do this, the 4G eNB 14 might update the context record for the UE's connection to indicate that the UE's connection now includes the TDD carrier 16 and the FDD carrier 18, and the 4G eNB 14 might transmit to the UE an RRC connection reconfiguration message that directs the UE to operate on the two carriers concurrently.

With carrier aggregation, as noted above, one of the carriers in the UE's connection might be deemed a PCC and the other carrier (or each of one or more other carriers) might be deemed an SCC. For instance, the 4G eNB 14 might specify which is which in the context record and by using associated index numbering in the RRC connection reconfiguration message. For instance, the TDD carrier 16 on which the UE initially connected could be the PCC, and the FDD carrier 18 could be an SCC.

With carrier aggregation service so configured, the 4G eNB 14 could then serve the UE concurrently on the TDD carrier 16 and the FDD carrier 18, such as by scheduling some data communication with the UE to occur on PRBs of one carrier concurrently with other data on PRBs on the other carrier. In practice, however, as noted above, certain key communications might be provided specifically on the PCC rather than on the SCC. Further, in some implementations, the PCC might be used for both downlink and uplink communication but the SCC might be used for just downlink communication.

Still further, when the UE is connected with and served by the 4G eNB 14, the 4G eNB 14 may coordinate setup of a secondary, 5G connection between the UE and the 5G gNB 20, and the 4G eNB 14 and 5G gNB 20 may then serve the UE with dual-connectivity, likewise to help provide the UE with increased peak data rate of communication. (With 4G LTE and 5G NR, this dual-connectivity might be EUTRA-NR Dual Connectivity (EN-DC)). By way of example, when the UE is connected with and served by the 4G eNB 14 on the TDD carrier 16, the 4G eNB 14 might receive a report from the UE that the UE is also within threshold strong coverage of the 5G gNB 20. The 4G eNB 14 may then engage in signaling with the 5G gNB 20, with the MME 30, and with the UE, to coordinate setup of the secondary 5G connection for the UE and setup of one or more split bearers, enabling the 4G eNB 14 and the 5G gNB 20 to concurrently serve the UE over their respective connections.

With dual-connectivity established, one of the UE's connections might function as an anchor connection, for carrying certain key signaling associated with the UE's dual-connectivity service. For instance, with EN-DC, the UE's 4G connection with the 4G eNB 14 could be the anchor connection, and the UE's 5G connection with the 5G gNB 20 could be a secondary connection. Thus, if the UE is connected with and served by the 4G eNB 14 on a single carrier such as the TDD carrier 16, that carrier could be the anchor carrier for the UE's dual-connectivity service. And if the UE is connected with an served by the 4G eNB 14 on multiple carriers, the PCC of that connection could be the anchor carrier for the UE's dual-connectivity service.

As noted above, the TDD carrier 16 could be configured with a particular TDD frame configuration, such as one of the frame configurations shown in Table 1 for instance. For instance, the 4G eNB 14 could be programmed to apply a particular frame configuration for the TDD carrier 16 and could broadcast in its MIB or other system message on the TDD carrier 16 an indication of the frame configuration so that UEs such as UE 34 could operate accordingly. Further, the 4G eNB 14 might dynamically change the frame configuration of the TDD carrier 16 from time to time, such as according to a schedule or based on one or more other factors.

As further noted above, the present disclosure addresses the technological problem that could arise if UE 34 is going to engage in uplink-intensive communication but the TDD carrier 16 on which the UE is connected and served has limited effective uplink bandwidth. In that situation, the 4G eNB 14 could reconfigure the UE's connection with the 4G eNB 14 by replacing the TDD carrier 16 with the FDD carrier 18, based on the uplink bandwidth of the FDD carrier 18 being greater than the effective uplink bandwidth of the TDD carrier 16.

To facilitate this in the first place, the 4G eNB 14 could monitor to detect when the UE is going to engage in a predefined threshold great extent of uplink communication to the 4G eNB 14. The threshold great extent of uplink communication could be a threshold high rate of uplink communication, as a threshold great quantity of uplink communication per unit time, and/or perhaps another sort of threshold great quantity of uplink communication.

The 4G eNB 14 could detect this in various ways. By way of example, the 4G eNB 14 could detect when a bearer of a QCI value typically associated with heavy uplink communication is established for the UE, as an indication that the UE will engage in a threshold great extent of uplink communication. As another example, the 4G eNB 14 or another entity could inspect SIP signaling or other messaging to or from the UE and could determine based on that signaling that the UE is setting up or has set up a communication session of a type that is typically associated with heavy uplink communication.

As still another example, the 4G eNB 14 could evaluate ongoing uplink communication from the UE and determine that the ongoing uplink communication from the UE has been a threshold great extent, as an indication that that threshold great extent of uplink communication from the UE will continue. And as yet another example, the 4G eNB may otherwise consider history of uplink communication from the UE, such as that the UE has tended to engage in a threshold great extent of uplink communication at similar times per day, as an indication that the UE is about to again engage in a threshold great extent of uplink communication.

Note also that the act of the 4G eNB 14 detecting that the UE will engage in a threshold great extent of uplink communication to the 4G eNB 14 does not involve detecting merely that the UE will engage in non-zero uplink communication to the 4G eNB 14 but rather involves detecting that the extent of uplink communication in which the UE will engage will be threshold great rather than a trivial extent. Further, note that the 4G eNB 14 detecting this could be based on one or more predefined (e.g. pre-programmed) thresholds. And note that this is a prediction by the 4G eNB 14, which may or may not end up being correct.

In response to at least detecting that the UE will engage in a threshold great extent of uplink communication to the 4G eNB 14, the 4G eNB 14 could then decide to replace the TDD carrier 16 in the UE's connection with another carrier on grounds that the other carrier has an uplink bandwidth that is greater than the effective uplink bandwidth of the TDD carrier 16. In the example implementation, for instance, the 4G eNB 14 could decide to replace the TDD carrier 16 in the UE's connection with the FDD carrier 18 on grounds that the uplink bandwidth of the FDD carrier 18 is greater than the effective uplink bandwidth of the TDD carrier 16.

To make this decision, the 4G eNB 14 could be provisioned with, or could dynamically determine, the effective uplink bandwidth of the TDD carrier 16. As noted above, this uplink bandwidth could be the actual bandwidth of the TDD carrier 16 limited by how often the TDD carrier 16 is uplink. For example, the effective uplink bandwidth of the TDD carrier 16 could be the actual bandwidth of the TDD carrier multiplied by a ratio of the extent of time that the TDD carrier 16 is uplink to the extent of time that the TDD carrier 16 is not uplink, on a per frame basis for instance according to the carrier's TDD configuration. The time that the TDD carrier is uplink could be the number of subframes per frame that are uplink subframes and might further incorporate uplink time within any special subframes or the like, among other possibilities. By way of example, as discussed above, if the TDD carrier 16 has an actual bandwidth of 20 MHz and is configured with TDD frame configuration FC2, then the determined effective uplink bandwidth of the TDD carrier 16 might be about 4 MHz.

Further, the 4G eNB 14 could be provisioned with an indication of the uplink bandwidth of FDD carrier 20. By way of example, the FDD carrier 20 might have an uplink channel with a 5 MHz bandwidth.

Comparing the example 5 MHz uplink bandwidth of the FDD carrier 20 with the example 4 MHz effective uplink bandwidth of the TDD carrier 16, the 4G eNB 14 could thus determine that the uplink bandwidth of the FDD carrier 20 is greater than the effective uplink bandwidth of the TDD carrier 16. Based at least on this comparison (or on predefined data based on this comparison), the 4G eNB 14 could therefore decide to reconfigure the UE's connection with the 4G eNB 14 replacing the TDD carrier 16 with the FDD carrier 20 in response to at least having detected that the UE will engage in a threshold great extent of uplink communication to the 4G eNB 14.

Note also that if the 4G eNB 14 supports operation on multiple FDD carriers each having a respective uplink bandwidth, the 4G eNB 14 might select the FDD carrier 20 to replace the TDD carrier 16 in the UE's connection based on a determination that the uplink bandwidth of the FDD carrier 20 is greater than the effective uplink bandwidth of the TDD carrier 16. For instance, the 4G eNB 14 might determine that one or more of its supported FDD carriers has an uplink bandwidth that is not greater than the effective uplink bandwidth of the TDD carrier and may therefore not select each such FDD carrier, but the 4G eNB 14 might determine that a given one of its supported FDD carriers has an uplink bandwidth that is greater than the effective uplink bandwidth of the TDD carrier 16 and may therefore select that FDD carrier to replace the TDD carrier 16.

Further, the 4G eNB 14 could also base its decision to so reconfigure the UE's connection on one or more additional factors. For instance, the 4G eNB 14 could do so specifically also in response to the TDD carrier 16 on which the UE is connected with and served by the 4G eNB 14 being an anchor carrier of carrier-aggregation service and/or dual-connectivity service. Thus, if the TDD carrier 16 is not such an anchor carrier, then the 4G eNB 14 might not decide to so reconfigure the UE's connection in response to the detecting that the UE will engage in the threshold great extent of uplink communication to the 4G eNB 14. But if the TDD carrier 16 is such an anchor carrier, then the 4G eNB 14 might decide to so reconfigure the UE's connection in response to the detecting that the UE will engage in the threshold great extent of uplink communication to the 4G eNB 14.

Upon deciding to so reconfigure the UE's connection, the 4G eNB 14 could then carry out the reconfiguration. For example, in a scenario where the UE's connection with the 4G eNB 14 is on just the TDD carrier 16, the 4G eNB 14 could reconfigure the UE's connection to be on the FDD carrier 20 instead of being on the TDD carrier 16. Or in a scenario where the UE's connection with the 4G eNB 14 is on multiple carriers for carrier-aggregation service with the TDD carrier 16 being a PCC and the FDD carrier 20 being an SCC, the 4G eNB 14 might reconfigure the UE's connection to make the FDD carrier 20 the UE's PCC and the TDD carrier 16 an SCC. Other examples could be possible as well.

In line with the discussion above, the 4G eNB 14 could reconfigure the UE's connection by carrying out various operations such as updating the context record for the UE's connection and transmitting to the UE an RRC connection reconfiguration message that directs and causes a corresponding reconfiguration to occur at the UE as well.

Figure 2:
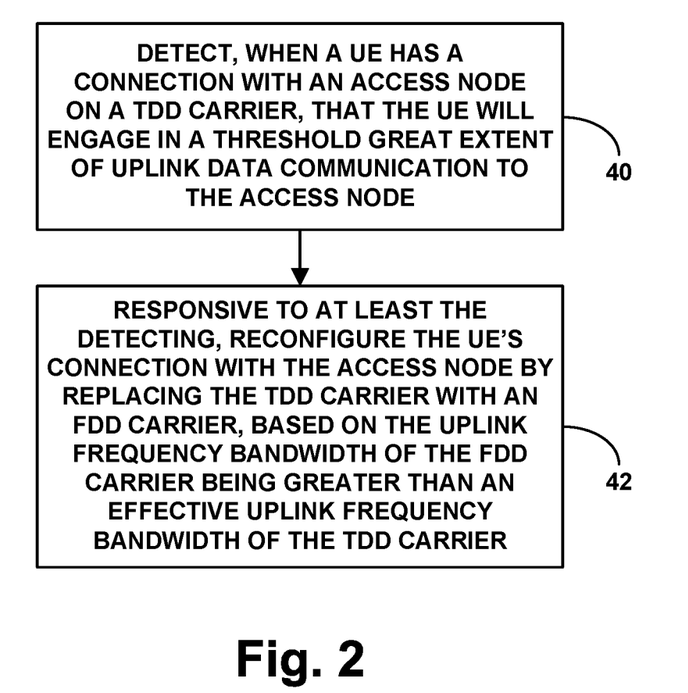
FIG. 2 is a flow chart depicting an example method in accordance with the disclosure.

FIG. 2 is a flow chart depicting an example method that could be carried out to control wireless connectivity between a UE and the access node such as the 4G eNB 14 (among other possibilities), in a scenario where the access node supports operation on a plurality of carriers including a FDD carrier and a TDD carrier, where FDD carrier has an uplink frequency bandwidth, and where the TDD carrier has an effective uplink frequency bandwidth that is defined based on an actual frequency bandwidth of the TDD carrier limited by how often the TDD carrier is uplink.

As shown in FIG. 2, at block 40, the method includes detecting, when the UE has a connection with the access node on the TDD carrier, that the UE will engage in a threshold great extent of uplink data communication to the access node. And at block 42, the method includes, responsive to at least the detecting, reconfiguring the UE's connection with the access node by replacing the TDD carrier with the FDD carrier, based on the uplink frequency bandwidth of the FDD carrier being greater than the effective uplink frequency bandwidth of the TDD carrier.

In line with the discussion above, the effective uplink bandwidth of the TDD carrier could be based on a product of (i) a ratio of time that the TDD carrier is uplink to time that the TDD carrier is not uplink and (ii) the actual frequency bandwidth of the TDD carrier.

Further, as discussed above, the access node could support operation on multiple FDD carriers, each having a respective uplink bandwidth, in which case the act of reconfiguring the UE's connection with the access node by replacing the TDD carrier with the FDD carrier based on the uplink frequency bandwidth of the FDD carrier being greater than the effective uplink frequency bandwidth of the TDD carrier could involve (i) the access node selecting the FDD carrier from among the multiple FDD carriers based on the uplink bandwidth of the FDD carrier being greater than the effective uplink frequency bandwidth of the TDD carrier and (ii) reconfiguring the UE's connection with the access node by replacing the TDD carrier with the selected FDD carrier.

In addition, as discussed above, the act of reconfiguring the UE's connection by replacing the TDD carrier with the FDD carrier based on the uplink frequency bandwidth of the FDD carrier being greater than the effective uplink frequency bandwidth of the TDD carrier could involve (i) comparing the uplink bandwidth of the FDD carrier with the effective uplink bandwidth of the TDD carrier, (ii) based on the comparing, making a determination that the uplink bandwidth of the FDD carrier is greater than the effective uplink bandwidth of the TDD carrier, and (iii) based on the determination, reconfiguring the UE's connection by replacing the TDD carrier with the FDD carrier.

Still further, as discussed above, the method could be carried while the access node is serving the UE with carrier aggregation, where the TDD carrier is a PCC of the carrier aggregation, in which case the act of reconfiguring of the UE's connection might be additionally responsive to the TDD carrier being the PCC of the carrier aggregation. And the method could be carried out while the UE is served with dual connectivity by the access node and by another access node, where the TDD carrier is an anchor carrier of the dual connectivity, in which case the act of reconfiguring of the UE's connection could be additionally responsive to the TDD carrier being the anchor carrier of the carrier aggregation.

Yet further, as discussed above, the act of detecting that the UE will engage in a threshold great extent of uplink data communication to the access node could involve detecting that the UE will engage in a communication session of a type associated with the threshold great extent of uplink data communication. And detecting that the UE will engage in a threshold great extent of uplink data communication to the wireless serving system could be based on communication history of the UE.

In addition, as discussed above, the act of replacing the TDD carrier with the FDD carrier could involve (i) updating a context record for the UE and (ii) signaling to the UE to direct the UE to communicate with the access node on the FDD carrier, as a replacement for the UE communicating with the access node on the TDD carrier.

Further, in an example implementation, after the access node has reconfigured the UE's connection by replacing the TDD carrier with the FDD carrier, the method could involve detecting that the UE will no longer engage in the threshold great extent of uplink data communication to access node, such as by detecting the ending of uplink-intensive communication for instance. And the method may then involve, responsive to at least the detecting that the UE will no longer engage in the threshold great extent of uplink communication to the access node, reconfiguring the UE's connection with the access node by replacing the FDD carrier with the TDD carrier.

Figure 3:
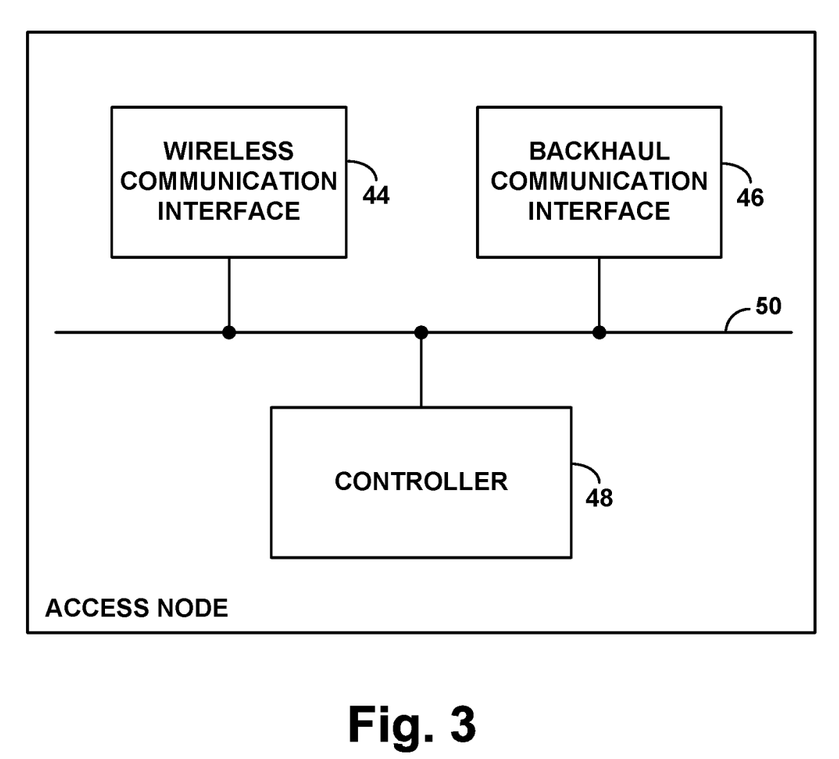
FIG. 3 is a simplified block diagram of an example access node operable in accordance with the disclosure.

Finally, FIG. 3 is a simplified block diagram of an example access node, which could be 4G eNB 14 in FIG. 1 among other possibilities, configured to carry out various disclosed operations, including various features described above for instance, to control wireless connectivity of a UE with the access node.

As shown in FIG. 3, the access node includes a wireless communication interface 44, a backhaul interface 46, and a controller 48, all of which may be communicatively linked together by a system bus, network, or other connection mechanism 50 and/or could be integrated together or distributed in various ways.

In this example arrangement, the wireless communication interface 44 could be configured to provide cellular coverage and to engage in air interface communication with served UEs. As such, wireless communication interface 44 could comprise an antenna structure, which could be tower mounted or could take other forms, and associated components such as power amplifiers and a wireless transceiver, to facilitate providing a coverage area on multiple carriers as shown in FIG. 1 and engaging in transmission and reception in accordance with a RAT such as any of those noted above. Further, the backhaul interface 46 could comprise a wired or wireless interface, such as an Ethernet network communication interface, configured to support communication with other entities, such as with various core-network entities and other access nodes for instance.

Controller 48 could then comprise control logic to cause the access node to carry out particular operations including those described herein. As such, the controller 48 could take various forms, including but not limited to a processing unit including one or more processors (e.g., one or more general purpose microprocessors and/or one or more dedicated processing units) and non-transitory data storage (e.g., one or more volatile and/or non-volatile storage components, such as magnetic, optical, or flash storage) holding program instructions executable by the processing unit to cause the processing unit and thus the access node to carry out various operations described herein.

It should also be understood that the present disclosure additionally contemplates a non-transitory computer readable medium that stores, has encoded thereon, or otherwise embodies program instructions executable to carry out such operations as well.

Exemplary embodiments have been described above. Those skilled in the art will understand, however, that changes and modifications may be made to these embodiments without departing from the true scope and spirit of the invention.

We claim:

1. A method for controlling wireless connectivity between a user equipment device (UE) and an access node, wherein the access node supports operation on a plurality of carriers including a frequency-division-duplex (FDD) carrier and a time-division-duplex (TDD) carrier, wherein FDD carrier has an uplink frequency bandwidth, and wherein the TDD carrier has an effective uplink frequency bandwidth that is defined based on an actual frequency bandwidth of the TDD carrier limited by how often the TDD carrier is uplink, the method comprising:

detecting, when the UE has a connection with the access node on the TDD carrier, that the UE will engage in a threshold great extent of uplink data communication to the access node; and responsive to at least the detecting, reconfiguring the UE's connection with the access node by replacing the TDD carrier with the FDD carrier, based on the uplink frequency bandwidth of the FDD carrier being greater than the effective uplink frequency bandwidth of the TDD carrier.

2. The method of claim 1, wherein the effective uplink bandwidth of the TDD carrier is based on a product of (i) a ratio of time that the TDD carrier is uplink to time that the TDD carrier is not uplink and (ii) the actual frequency bandwidth of the TDD carrier.

3. The method of claim 1, wherein the access node supports operation on multiple FDD carriers, each having a respective uplink bandwidth, and wherein reconfiguring the UE's connection with the access node by replacing the TDD carrier with the FDD carrier based on the uplink frequency bandwidth of the FDD carrier being greater than the effective uplink frequency bandwidth of the TDD carrier comprises:

selecting by the access node the FDD carrier from among the multiple FDD carriers based on the uplink bandwidth of the FDD carrier being greater than the effective uplink frequency bandwidth of the TDD carrier; and reconfiguring the UE's connection with the access node by replacing the TDD carrier with the selected FDD carrier.

4. The method of claim 1, wherein reconfiguring the UE's connection by replacing the TDD carrier with the FDD carrier based on the uplink frequency bandwidth of the FDD carrier being greater than the effective uplink frequency bandwidth of the TDD carrier comprises:

comparing the uplink bandwidth of the FDD carrier with the effective uplink bandwidth of the TDD carrier;

based on the comparing, making a determination that the uplink bandwidth of the FDD carrier is greater than the effective uplink bandwidth of the TDD carrier; and based on the determination, reconfiguring the UE's connection by replacing the TDD carrier with the FDD carrier.

5. The method of claim 1, wherein the method is carried out while the access node is serving the UE with carrier aggregation, wherein the TDD carrier is a primary component carrier of the carrier aggregation, and wherein the reconfiguring of the UE's connection is additionally responsive to the TDD carrier being the primary component carrier of the carrier aggregation.

6. The method of claim 1, wherein the method is carried out while the UE is served with dual connectivity by the access node and by another access node, wherein the TDD carrier is an anchor carrier of the dual connectivity, and wherein the reconfiguring of the UE's connection is additionally responsive to the TDD carrier being the anchor carrier of the carrier aggregation.

7. The method of claim 1, wherein detecting that the UE will engage in a threshold great extent of uplink data communication to the access node comprises detecting that the UE will engage in a communication session of a type associated with the threshold great extent of uplink data communication.

8. The method of claim 1, wherein detecting that the UE will engage in a threshold great extent of uplink data communication to the wireless serving system is based on communication history of the UE.

9. The method of claim 1, wherein replacing the TDD carrier with the FDD carrier comprises (i) updating a context record for the UE and (ii) signaling to the UE to direct the UE to communicate with the access node on the FDD carrier, as a replacement for the UE communicating with the access node on the TDD carrier.

10. The method of claim 1, further comprising:

subsequently detecting, after reconfiguring the UE's connection with the access node by replacing the TDD carrier with the FDD carrier, that the UE will no longer engage in the threshold great extent of uplink data communication to access node; and responsive to at least the subsequently detecting, reconfiguring the UE's connection with the access node by replacing the FDD carrier with the TDD carrier.

11. An access node configured to control wireless connectivity of a user equipment device (UE) with the access node, the access node comprising:

a wireless communication interface through which to engage in wireless communication, wherein the wireless communication interface supports operation on a plurality of carriers including a frequency-division-duplex (FDD) carrier and a time-division-duplex (TDD) carrier, wherein FDD carrier has an uplink frequency bandwidth, and wherein the TDD carrier has an effective uplink frequency bandwidth that is defined based on an actual frequency bandwidth of the TDD carrier limited by how often the TDD carrier is uplink;

a backhaul network interface through which to communicate with other entities; and a controller configured to control connectivity of the UE, wherein the controller is configured to detect, when the UE has a connection with the access node on the time-division-duplex (TDD) carrier, that the UE will engage in a threshold great extent of uplink data communication, and wherein the controller is configured to respond to at least the detecting by reconfiguring the UE's connection with the access node to replace the TDD carrier with the FDD carrier, based on the uplink frequency bandwidth of the FDD carrier being greater than the effective uplink frequency bandwidth of the TDD carrier.

12. The access node of claim 11, wherein the controller comprises a processing unit, non-transitory data storage, and program instructions stored in the non-transitory data storage and executable by the processing unit.

13. The access node of claim 11, wherein the effective uplink bandwidth of the TDD carrier is based on a product of (i) a ratio of time that the TDD carrier is uplink to time that the TDD carrier is not uplink and (ii) the actual frequency bandwidth of the TDD carrier.

14. The access node of claim 11, wherein reconfiguring the UE's connection by replacing the TDD carrier with the FDD carrier based on the uplink frequency bandwidth of the FDD carrier being greater than the effective uplink frequency bandwidth of the TDD carrier comprises:

comparing the uplink bandwidth of the FDD carrier with the effective uplink bandwidth of the TDD carrier;

based on the comparing, making a determination that the uplink bandwidth of the FDD carrier is greater than the effective uplink bandwidth of the TDD carrier; and based on the determination, reconfiguring the UE's connection by replacing the TDD carrier with the FDD carrier.

15. The access node of claim 11, wherein the TDD carrier is a primary component carrier of carrier aggregation service of the UE, and wherein the reconfiguring of the UE's connection is additionally responsive to the TDD carrier being the primary component carrier of the carrier-aggregation service.

16. The access node of claim 11, the TDD carrier is an anchor carrier of dual-connectivity service of the UE, and wherein the reconfiguring of the UE's connection is additionally responsive to the TDD carrier being the anchor carrier of the dual-connectivity service.

17. The access node of claim 11, wherein detecting that the UE will engage in a threshold great extent of uplink data communication to the access node comprises detecting that the UE will engage in a communication session of a type associated with the threshold great extent of uplink data communication.

18. The access node of claim 11, wherein detecting that the UE will engage in a threshold great extent of uplink data communication to the wireless serving system is based on communication history of the UE.

19. The access node of claim 11, wherein replacing the TDD carrier with the FDD carrier comprises (i) updating a context record for the UE and (ii) signaling to the UE to direct the UE to communicate with the access node on the FDD carrier, as a replacement for the UE communicating with the access node on the TDD carrier.

20. The access node of claim 11, wherein the controller is further configured to subsequently detect, after reconfiguring the UE's connection with the access node by replacing the TDD carrier with the FDD carrier, that the UE will no longer engage in the threshold great extent of uplink data communication to access node and, responsive to at least the subsequently detecting, reconfigure the UE's connection with the access node by replacing the FDD carrier with the TDD carrier.

\* \* \* \* \*